W. H. BRODEN.
Target.
No. 215,431. Patented May 20, 1879.
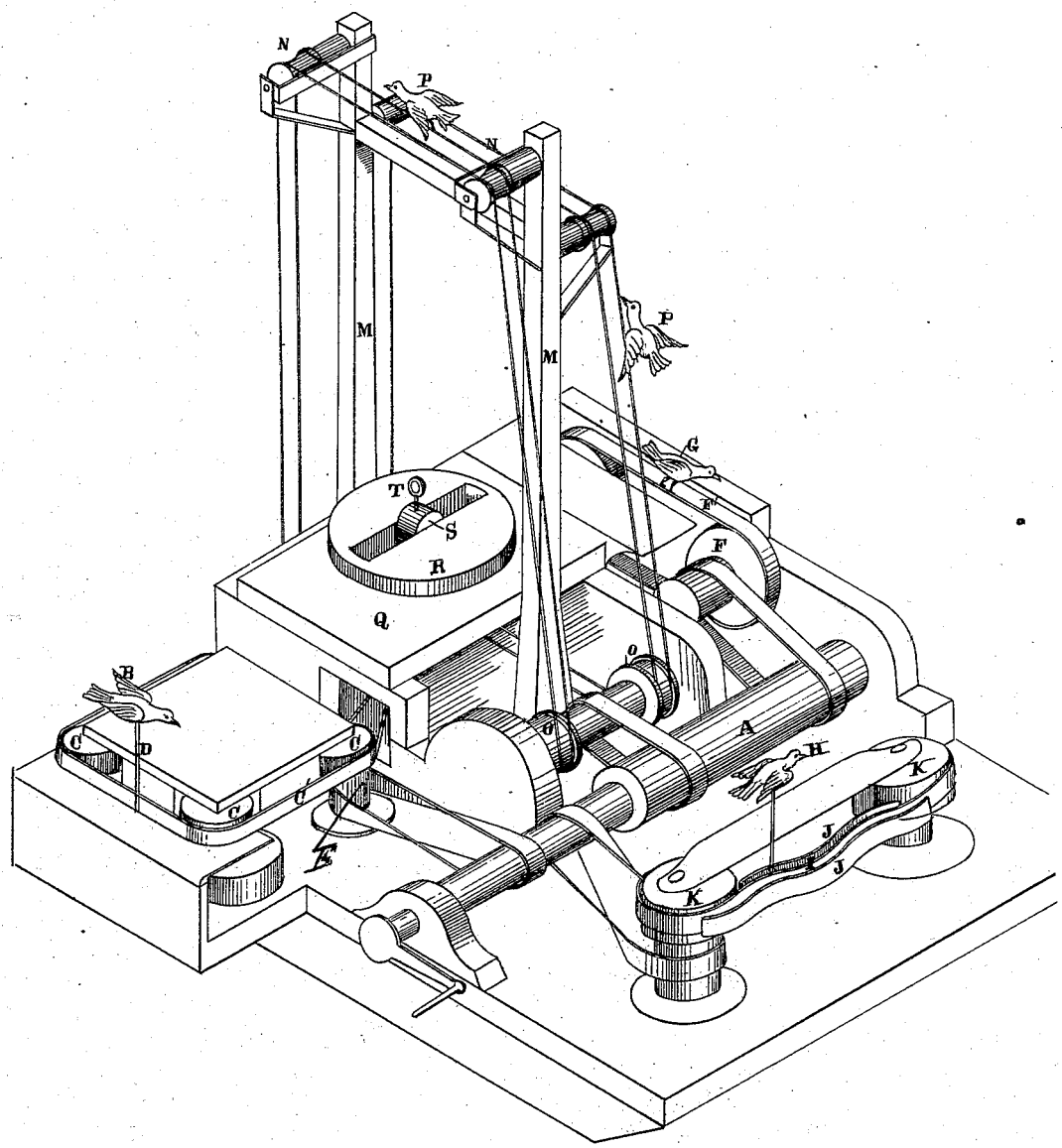
Witnesses
Geo. H. Strong.
Frank A. Brooks
Inventor
William H. Broden
By Dewey & Co.
Attys

UNITED STATES PATENT OFFICE.

WILLIAM H. BRODEN, OF WEBB'S LANDING, CALIFORNIA.

IMPROVEMENT IN TARGETS.

Specification forming part of Letters Patent No. 215,431, dated May 20, 1879; application filed February 19, 1879.

*To all whom it may concern:*

Be it known that I, WILLIAM H. BRODEN, of Webb's Landing, county of San Joaquin, and State of California, have invented an Apparatus for Target Practice; and I hereby declare the following to be a full, clear, and exact description thereof, reference being had to the accompanying drawing.

My invention relates to an improved apparatus for target practice, which I call the "Practical Wing-Shooting Aimator," and it is intended to present several movable objects at which to shoot, each moving in different directions or at different speeds, to represent the motion of different varieties of birds. The various devices are arranged at different elevations, so that practice may be had at surface-shooting or high-shooting, and the objects may be moved in different directions and at different speeds, so as to furnish a variety of movable targets.

The various objects are moved by a series of pulleys and belts, and the objects themselves, in form representing different birds, may be made partially of metal, so as to give out a ringing sound when struck, and partly of paper, which may be replaced, so that the fact of hitting the target may be recorded.

The various movable targets connected with my apparatus may be placed in a field in close enough proximity to each other so that they may all be operated from one shaft, which may be operated by hand, horse, or other power. For convenience I have shown them in the drawing as placed quite close together, although I do not wish to confine myself to this particular arrangement. The different moving objects might be placed in line, if desired, one beside the other, so that different persons might shoot at different marks at the same time.

In the accompaying drawing the figure is a perspective view of my apparatus.

Let A represent the main shaft, from which the various operative parts are moved by means of belts. The target which I have designed for surface-shooting, where it is desired to shoot at an object moving over a level surface close to the ground, is represented at B. At the four corners of a square are four pulleys, C, around which passes a belt, C'. On this belt is a short rod, D, on which is the movable object, in the form of a duck or other bird, as shown. This target B is made of the proper size of a bird, and may be made of metal and hollow, so as to give off a ringing sound when struck. I have shown this target, however, as bird-shaped, the center being cut away, so that paper may be pasted on or held by a spring over the hole. Then, when the target is struck, holes are made in the paper by the shot. One of the pulleys C is extended down, as shown at E, and a belt from this lower part is rotated by the main shaft. This revolves the belt C' around the four pulleys C, and carries the bird-target B around the four corners of the square. Being moved in this way, the bird-target is moved away from the shooter to the left, toward him, and to the right consecutively, giving an opportunity to shoot at it going in either direction.

Another pair of rollers, F, carrying a belt, F', are driven by a belt from the main shaft, as shown. On this belt F' is secured a target, G, also in the shape of a bird, and constructed similar to that previously described. These rollers F and belt F' are operated by belt from the main shaft. The bird-target on this belt goes across in front of the marksman, and then goes over the roller and out of sight, and comes in view again at the upper end. This belt will be, in practice, some sixty or seventy feet long, and the target will pass along in front of the marksman very rapidly at a height of from fifteen to thirty feet from the ground. By taking different positions with relation to the movement of the target, practice may be had at the mark at different points while it is rapidly moving as a duck would in mid-air. Supplemental rollers may be placed under this belt to keep it in a level position.

The bird-target represented at H, and mounted on a rod secured to the belt I, is intended for a snipe-shooting target, the image representing the irregular movements of that bird. Irregularly-formed pieces of metal, J, serve as guides for the belt, directing it in an irregular wave-line similar to the movements of the snipe. The belt I passes around the rollers K, which are operated from the main shaft by a belt. Smaller rollers (not shown) keep the belt moving horizontally, and prevent it from sagging down. This form of target is particularly efficient for snipe-shooting practice, as the irregular movements of the bird are faithfully represented. Small pulleys set at irregular spaces may take the places of the metal guides, the pulleys being placed on each side of the belt at irregular intervals, so as to give the wave motion to the belt.

On an upright frame, M, are mounted grooved pulleys N, around which pass double wire ropes or cords, operated by belt from the main shaft A. Grooved pulleys O under each side of the frame direct the course of the wire ropes or cords. These wire cords then pass up on one side of the frame, across, and down the other side. They are made double, as shown, and on them is placed a bird-target, P. This frame is quite high, and is meant to carry the bird as if flying at a height above the ground sufficient to give practice for long-range wing-shooting.

It is intended that the bird-target be only fired at as it crosses between the frames. This bird-target may be made of metal, and have a sheet of paper or card-board placed at the middle, which will show the perforations of shot.

The frame may be continued up and another set of wire cords and pulleys placed at a greater elevation, if desired, the principle being the same in each case, the heights only being different.

On a stand or table, Q, is placed a movable disk, R, on which is a roller, S, said roller being revolved by belt suitably connected with the main shaft. On this roller is secured a rod, on which is a small ring or target, T, which revolves with the roller. The movable disk R is slotted, as shown, so as to allow the target T to pass under and over as the roller revolves. This target is intended for practice at pigeon-shooting, and works like a tumbler-pigeon when started from a trap. It is carried up over and down again quickly, and considerable skill is required to hit it. By slightly turning the movable disk R the target may be made to rise and fall to either the right or left, so that the irregular motions of a pigeon may be imitated. This target may also have a sheet of paper at its center, which will show when it is perforated by the shot. This target moves very rapidly, and gives good practice for snap-shooting.

With these differently-arranged devices operating from the same power-shaft, practice in several ways may be gained. Novices may learn to handle a gun properly under different conditions, and good shots may keep in practice without having to go to the field.

Having thus described my invention, what I claim as new, and desire to secure by Letters Patent, is—

1. The bird or other moving target, B, supported by the standard D from the belt C', which moves horizontally around the pulleys C, in combination with the driving-belt and shaft A, substantially as and for the purpose herein described.

2. The horizontally-moving belt F', passing over the pulley F upon horizontal axis, and supporting the bird or target G, substantially as and for the purpose herein described.

3. The horizontally-placed slotted movable disk R, with its roller S and belt, said belt being provided with the target T, which rises into sight and disappears, substantially as and for the purpose herein described.

4. The target or bird H, supported from the belt I, which moves around vertical drums or pulleys K, in combination with the guides or rollers J, whereby irregular or erratic motions of the bird or target are produced, substantially as herein described.

5. The birds or targets P, secured to the belts or cords N, said cords being driven over pulleys mounted upon the frame M and the pulleys O, whereby the motions of rising from the ground and flying at a height are imitated, substantially as herein described.

6. A target apparatus consisting of the birds or targets made of hollow metal or partially of paper, and mounted upon the carrying-belts, driven by the belts and the shaft A, so as to imitate the motions of flying birds, substantially as and for the purpose herein described.

In witness whereof I have hereunto set my hand.

WILLIAM H. BRODEN.

Witnesses:
CHAS. G. YALE,
FRANK A. BROOKS.